United States Patent [19]
Griffin

[11] Patent Number: 5,540,347
[45] Date of Patent: *Jul. 30, 1996

[54] VENT VALVE ASSEMBLY FOR A FUEL TANK FILLER NECK CAP

[75] Inventor: Jeffery Griffin, Connersville, Ind.

[73] Assignee: Stant Manufacturing Inc., Connersville, Ind.

[ * ] Notice: The term of this patent shall not extend beyond the expiration date of Pat. No. 5,480,055.

[21] Appl. No.: 239,041

[22] Filed: May 6, 1994

[51] Int. Cl.⁶ .................................................. B65D 51/16
[52] U.S. Cl. .................. 220/203.23; 137/493.1; 220/203.01; 220/203.05; 220/203.29; 220/304; 220/DIG. 33
[58] Field of Search .................. 220/202, 203.01, 220/203.05, 203.23, 203.29, 303, 86.1, 304, 86.2, 360, DIG. 33; 137/493.9, 493.1

[56] References Cited

U.S. PATENT DOCUMENTS

| | | | |
|---|---|---|---|
| 3,807,442 | 4/1974 | Sumner et al. | 137/493.9 X |
| 3,858,751 | 1/1975 | Gerdes . | |
| 3,938,692 | 2/1976 | Crute | 220/203 |
| 3,985,260 | 10/1976 | Evans | 220/303 X |
| 4,036,399 | 7/1977 | Gerdes . | |
| 4,162,021 | 7/1979 | Crute | 220/303 X |
| 4,294,281 | 10/1981 | Gerdes . | |
| 4,498,493 | 2/1985 | Harris . | |
| 4,540,103 | 9/1985 | Kasugai et al. | 220/303 X |
| 4,676,390 | 6/1987 | Harris . | |
| 4,779,755 | 10/1988 | Harris . | |
| 5,108,001 | 4/1992 | Harris | 220/DIG. 33 X |
| 5,479,978 | 1/1996 | Zenkich | 137/493.3 |

*Primary Examiner*—Allan N. Shoap
*Assistant Examiner*—Robin A. Hylton
*Attorney, Agent, or Firm*—Barnes & Thornburg

[57] ABSTRACT

A vent-valve assembly is provided for use in a filler neck fuel cap. The vent-valve assembly includes a valve housing, a vacuum-relief valve subassembly which is spring-biased within the housing to channel ambient air and fuel vapor through the valve housing, and a pressure-relief valve subassembly which rides upon the vacuum-relief valve subassembly. The vacuum-relief valve subassembly includes a vacuum-relief spring and a vacuum-relief valve. The vacuum-relief valve has a valve member which rests upon the vacuum-relief spring and guide legs which depend from the valve member around the vacuum-relief spring. Flanges or feet extend out from the guide legs and engage the valve housing when the pressure-relief valve subassembly is removed from the housing. Thus, the valve housing and vacuum-relief valve cooperate to form an easy-to-assemble, self-contained, vent-valve assembly.

41 Claims, 4 Drawing Sheets

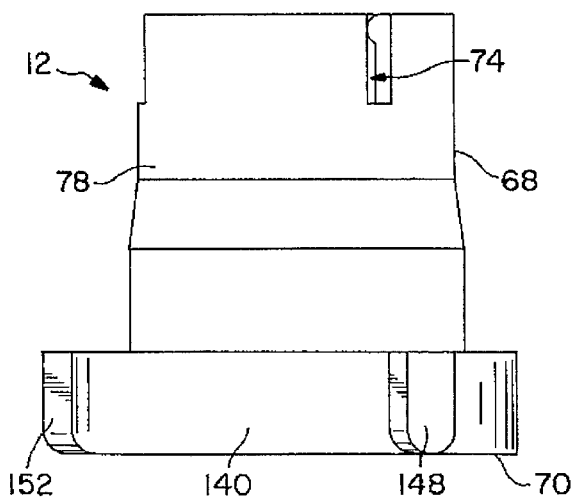
FIG. 5
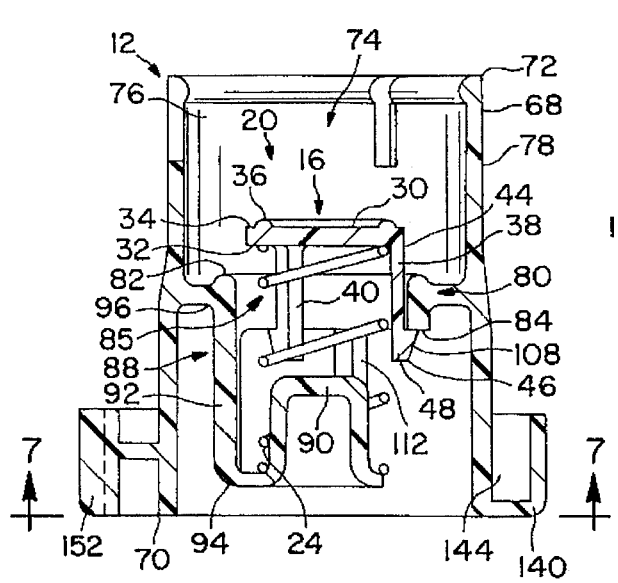
FIG. 6
FIG. 7

VENT VALVE ASSEMBLY FOR A FUEL TANK FILLER NECK CAP

BACKGROUND AND SUMMARY OF THE INVENTION

This present invention relates to vent-valve assemblies and, particularly, to a pressure-relief and vacuum-relief valve subassembly for a fuel tank filler neck cap. More particularly, the present invention relates to a self-contained pressure-relief and vacuum-relief valve subassembly which is designed for insertion into a filler neck cap.

Conventional pressure-relief and vacuum-relief valves are generally well-known items and are currently in widespread use. See, for example, U.S. Pat. No. 4,498,493 to Harris and U.S. Pat. No. 4,779,755 to Harris. Although pressure-relief and vacuum-relief valves are currently in widespread use, it would be desirable to provide an alternative assembly that is simpler to assemble and to install into a fuel cap.

More and more vehicles are subjected to extreme fluctuations in pressure and vacuum conditions within their fuel tanks and thus need filler neck caps having a pressure-relief and vacuum-relief valve provided therein. It is sometimes difficult to install conventional pressure-relief and vacuum-relief valves into the caps during assembly. A pressure-relief and vacuum-relief valve subassembly that is self-contained and which is readily inserted into a housing of a filler neck cap would be a welcome improvement over conventional pressure-relief and vacuum-relief valves. What is needed is a self-contained vent-valve assembly that is easily inserted into a filler neck cap during assembly.

According to the present invention, a self-contained vent-valve assembly is provided for use in a filler neck cap. The vent-valve assembly includes a valve housing and means for channeling ambient air and fuel vapor through the valve housing. The channeling means includes a vacuum-relief valve subassembly which is spring-biased within the housing and a pressure-relief valve subassembly which rides upon the vacuum-relief valve subassembly. The valve housing and channeling means cooperate to form an easy-to-assemble, self-contained, vent-valve assembly.

In preferred embodiments of the present invention, the vacuum-relief valve subassembly includes a vacuum-relief valve and a vacuum-relief spring. The vacuum-relief valve itself includes a valve member which rests upon the vacuum-relief spring and guide legs which depend from the valve member around the vacuum-relief spring. The vacuum-relief valve is retained in the valve housing by flanges or feet which extend out from the guide legs and engage the valve housing. Illustratively, the vacuum-relief valve includes three guide legs that are arranged in spaced-apart relation about the circumference of the valve member.

Furthermore, the pressure-relief valve subassembly is mounted within the housing to lie above the vacuum-relief valve subassembly. The pressure-relief valve subassembly includes a pressure-relief spring, an annular valve plate, and a pressure-relief valve which is coupled to the annular valve plate. Following assembly, the pressure-relief spring applies a biasing force to urge the pressure-relief valve downwardly against a circular lip provided in the housing and the underlying spring-loaded vacuum-relief valve.

The housing itself has a body that is tubular in shape and has an inner end, an outer end, and an air passageway extending therethrough. This tubular body further includes the circular lip and a valve brace. Illustratively, the lip extends into the air passageway for engagement with the flanges of the guiding legs to spring-bias the vacuum-relief valve within the valve housing. Furthermore, the valve brace includes three downwardly depending L-shaped legs which are arranged in spaced-apart relation about the circumference of the lip to provide a mount for the vacuum-relief spring. Thus, both the vacuum-relief valve subassembly and the pressure-relief valve subassembly are positioned within the air passageway of the tubular housing and are ready for easy installation into a fuel cap.

The initial development was undertaken to create a high vacuum flow valve. Due to the spring required to meet the flow specifications, it was necessary to create a means of retaining the vacuum valve and spring to the housing prior to the assembly of the pressure-relief valve.

The function of the vacuum valve is to allow atmospheric air into the tank during vacuum conditions. The sub-assembly of the vacuum valve to the housing is necessary to hold the valve in place prior to the assembly of the pressure-relief valve. This is accomplished by fingers with snaps extending from the body of the valve radially which snap into the housing and retain the spring and vacuum valve during assembly. The valve assembly in accordance with the present invention allows for an easier assembly by retaining the vacuum valve and spring prior to the installation of the pressure-relief valve.

It is quite simple to put together a vent-valve assembly in accordance with the present invention. The user must only extend the vacuum-relief spring through the outer end of the valve housing and place it upon the valve brace. Once in place, the vacuum-relief spring is released so that it extends in an upward direction past the lip. At this time, the user places the vacuum-relief valve upon the spring and presses it in the downward direction toward the brace until the flanges snap past the lip. The snapping sound serves as an indication to the user that the vacuum-relief valve subassembly is securely locked within the valve housing to form a convenient self-contained vent-valve subassembly.

Once the vacuum-relief valve assembly is secured within the housing, the user simply fastens the pressure-relief valve and the annular valve plate together and places them into the outer end of the valve housing so that the pressure-relief valve sits upon the vacuum-relief valve. The user completes the construction of the vent-valve assembly by inserting the pressure-relief spring through the outer end of the valve housing and placing it upon the annular lip. Illustratively, the self-contained vent-valve assembly is inserted into one of a variety of available fuel caps to regulate the flow of ambient air and fuel vapors into and out of a fuel tank filler neck.

A user of the vent-valve assembly in accordance with the present invention will find that the vacuum-relief valve which is coupled for movement within the valve housing before installation of the pressure-relief valve therein makes the vent-valve assembly easier to assemble and use than traditional vacuum-relief and pressure-relief valves.

Additional objects, features, and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5 is a side elevational view of the valve housing of FIGS. 1 and 2 before it is installed in a fuel cap;

FIG. 6 is a transverse sectional view of the valve housing of FIG. 5 showing the position of a vacuum-relief valve before installation of the pressure-relief valve disk into the valve housing and showing the vacuum-relief valve urged upwardly to a raised position by a coiled spring and held in place by engagement of downwardly extending fingers and a flange underneath the lip for the pressure-relief valve; and FIG. 7 is a bottom plan view of the valve housing of FIG. 6 showing three fingers engaging the flange underneath the lip for the pressure-relief valve.

DETAILED DESCRIPTION OF THE DRAWINGS

Figure 1:
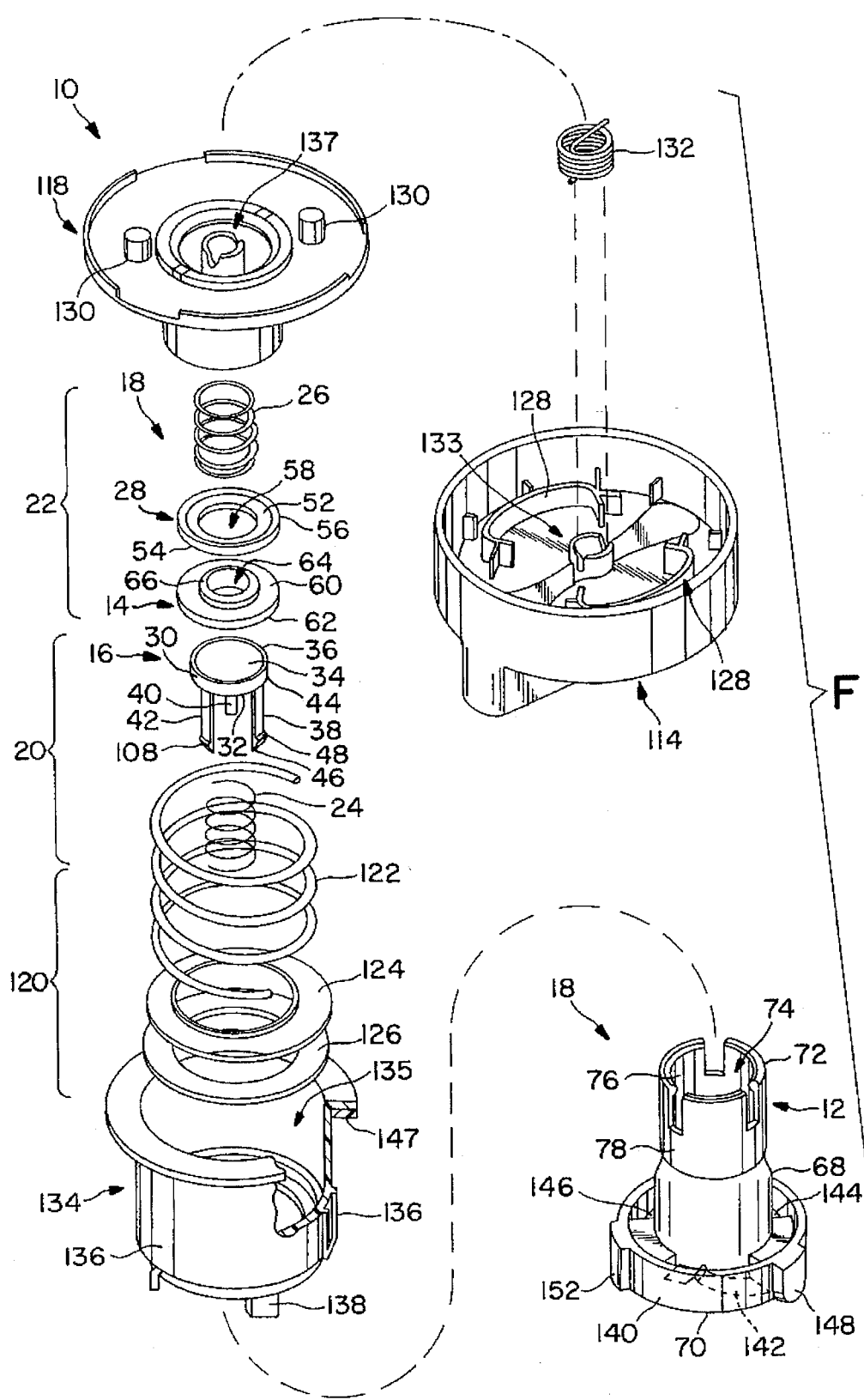
FIG. 1 is an exploded assembly view of a cap including the vent-valve assembly of the present invention showing a cover, a torsion spring, an upper core having a pair of cylindrical driven lugs, a pressure-relief valve subassembly including a pressure-relief spring, an annular valve plate, and a pressure-relief valve, a vacuum-relief valve subassembly including a vacuum-relief valve and a vacuum-relief spring, a sleeve-biasing assembly including a cam follower spring, an annular seal plate, and an annular seal, a sleeve having cam followers extending downwardly therefrom, and a valve housing having an air and fuel vapor flow passageway extending therethrough.
Figure 2:
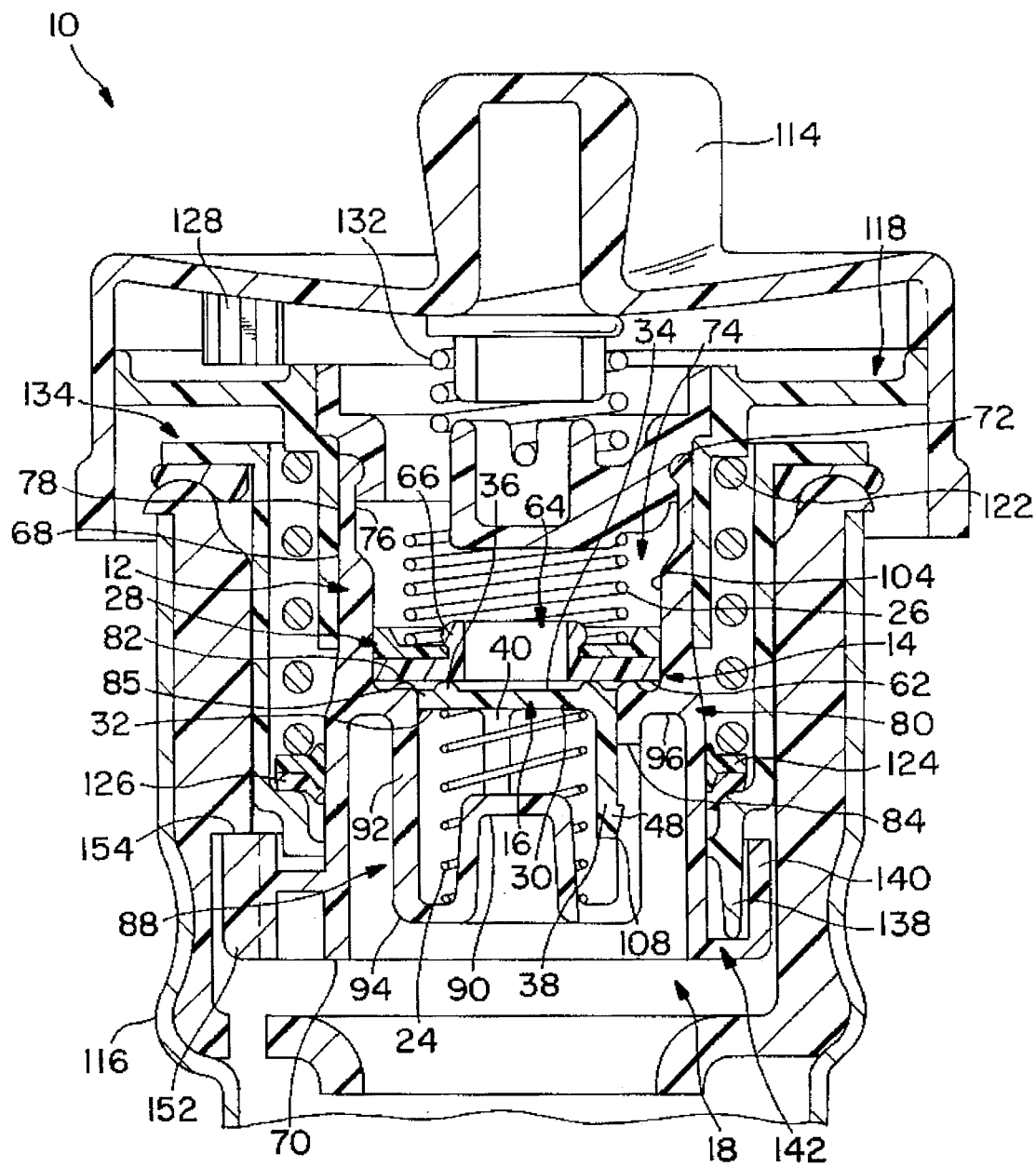
FIG. 2 is a transverse sectional view of the fuel cap of FIG. 1. after it has been assembled and installed into a filler neck and showing a self-contained valve assembly inside the fuel cap, the valve assembly including a pressure-relief valve spring-biased to a closed position against a lip and a vacuum-relief valve spring-biased to a closed position against the pressure-relief valve.

A cap 10 is shown in FIG. 1 as it would appear as the cap 10 is being assembled. When fully assembled, as shown in FIG. 2, cap 10 includes a valve housing 12 containing a pressure-relief valve 14 and a vacuum-relief valve 16. Advantageously, the valve housing 12 is constructed to make it much easier to assemble the vacuum-relief valve 16 and the companion pressure-relief valve 14 in one housing for use in a filler neck cap 10 or the like. Essentially, the spring-biased vacuum-relief valve 16 is held in place inside valve housing 12 prior to assembly of the pressure-relief valve 14 into the valve housing 12 to create a convenient vent valve subassembly.

Referring now to FIG. 1, a vent-valve assembly 18 is constructed independently from and prior to the assembly of cap 10. The vent-valve assembly 18 includes the valve housing 12, a vacuum-relief valve subassembly 20, and a pressure-relief valve subassembly 22. The vacuum-relief valve subassembly 20 includes the vacuum-relief valve 16 and a vacuum-relief spring 24, and the pressure-relief valve subassembly 22 includes a pressure-relief spring 26, an annular valve plate 28, and the pressure-relief valve 14.

The vacuum-relief valve subassembly 20 is formed to be inserted into and coupled for movement with the valve housing 12 as shown in FIGS. 1 and 6. The vacuum-relief valve 16 of the vacuum-relief assembly 20 includes a valve member 30 having an axially inward side 32 and an axially outward side 34. The valve member 30 itself is formed for axially inward and axially outward movement throughout an air passageway 74 formed in the valve housing 12.

As shown best in FIG. 1, the valve member 30 includes three guide legs 38, 40, 42 appended to its axially inward side 32 and a circular sealing rim 36 extending about the circumference of the axially outward side 34 and projecting away from side 34 in an axially outer direction toward the overlying pressure-relief valve 14. Each of the three guide legs 38, 40, 42 is formed to include an upper end 44 fixed to the axially inward side 32 of the valve member 30 and a lower end 46 formed to engage the valve housing 12. The lower end 46 has a radially outwardly extending foot portion 48 mounted thereon. Each foot portion 48 is formed to engage the valve housing 12 to help hold the vacuum-relief assembly 20 in place before placement of the pressure-relief valve subassembly 22 into the valve housing 12 as shown, for example, in FIGS. 6 and 7.

The pressure-relief valve subassembly 22 is formed for placement into the valve housing 12 in an axially outer position relative to the vacuum-relief valve 16 as shown in FIG. 2 following mounting of the vacuum-relief valve subassembly 20 in a preliminary position in the valve housing 12 as shown in FIGS. 6 and 7. The annular valve plate 28 of the pressure-relief valve subassembly 22 includes an outer side 52 formed to hold the pressure-relief spring 26 thereon and an inner side 54. A rim 56 extends about the circumference of the outer side 52 in order to block sliding radially outward movement of the pressure-relief spring 26 thereon. Ideally, an aperture 58 extends through the annular valve plate 28 from the outer side 52 to the inner side 54 so that ambient air may flow therethrough.

The disc-shaped pressure-relief valve 14 includes an axially outward surface 60, an axially inward surface 62, and an air flow aperture 64 extending therebetween as shown in FIG. 1. In preferred embodiments, the pressure-relief valve 14 is coupled to the annular valve plate 28 so that the aperture 58 and the air flow aperture 64 are aligned thus permitting ambient air flow therethrough during operation of cap 10 as shown in FIG. 2. Ideally, the pressure-relief valve 14 includes a holding portion 66 arranged to extend from the outward surface 60 in an axially outward direction about the circumference of the air flow aperture 64. This holding portion 66 extends through the aperture 58 of the annular valve plate 28 and engages the outer side 52 of the annular valve plate 28. It is contemplated that the pressure-relief valve 14 may be coupled to the annular valve plate 28 using flanges, adhesives, or any suitable coupling means.

The valve housing 12 of the vent-valve assembly 18 holds both the vacuum-relief valve subassembly 20 and the pressure-relief valve subassembly 22 therein as shown, for example, in FIG. 2. The valve housing 12 is shown best in FIGS. 6 and 7 and has a necked-down tubular body 68 having an axially inner end 70, an axially outer end 72, and an air passageway 74 communicating with the axially inner end 70 and the axially outer end 72. The valve housing 12 further includes a radially inwardly facing interior surface 76 and a radially outwardly facing exterior surface 78.

As shown in FIG. 2, the valve housing 12 preferably includes an annular flange 80 extending into the air passageway 74 from the radially inwardly facing interior surface 76 and having means for providing an annular seat for receiving the pressure-relief valve 14 thereon. Ideally, the annular flange 80 has an axially outwardly facing lip 82 for sealingly engaging the pressure-relief valve 14 as shown in FIG. 2, an axially inwardly facing retaining rim 84 for engaging the foot portions 48 to retain the vacuum-relief valve subassembly 20 within the air passageway 74 prior to installation of the pressure-relief valve 14 as shown in FIG. 6, and a vent aperture 85 extending between the seating means and the retaining rim 84 and forming a part of air passageway 74 as shown in FIG. 6. Ideally, the foot members 48 of the guide legs 38, 40, 42 engage the axially inwardly facing retaining rim 84 of the annular flange 80 upon removal of the pressure-relief valve 14 from the valve housing 12.

Furthermore, the valve housing 12 includes a brace 88 positioned in the air passageway to serve as a seat for the vacuum-relief spring 24. Ideally, the brace 88 is mounted to the axially inwardly facing retaining rim 84 of the annular flange 80 and extends axially inwardly through the air passageway 74 toward the axially inner end 70 of the valve housing 12. The brace 88 itself also prevents radially outward movement of the vacuum-relief valve subassembly 20 in the valve housing 12 and limits the amount of axially inward movement of the vacuum-relief valve 16 in the air passageway 74 in order to retain the vacuum-relief valve 16 within the valve housing 12. The brace 88 includes a valve stop 90 and three branches 92, 110, 112 which extend out from the valve stop 90 and engage the valve housing 12 as shown, for example, in FIG. 7. Illustratively, branch 92 has an inner end 94 fixed to the valve stop 90 and an outer end 96 coupled to the annular flange 80 as shown in FIG. 6. It is contemplated that the brace 88 may alternatively extend into the air passageway 74 from the radially inwardly facing surface 76 of the valve housing 12 or from comparable mounting surfaces.

As further shown in FIG. 2, following installation of the self-contained vent-valve assembly 18 into cap 10, the vacuum-relief valve 16 assumes a closed position biased against the overlying pressure-relief valve 14. In this closed position, the valve member 30 of the vacuum-relief valve 16 lies in the aperture 85 defined by the annular flange 80 and the pressure-relief valve 14 simultaneously engages the circular lip 82 and the surrounding vacuum-relief valve 16. The pressure-relief spring 26 pushes the pressure-relief valve 14 against the annular lip 82 on valve seat 80 and the vacuum-relief spring 24 urges the raised annular rim 36 on the vacuum-relief valve 16 against the underside 62 of the pressure-relief valve 14.

In preferred embodiments, a seal is established in the valve housing 12 to prevent the flow of ambient air and fuel vapors through the air passageway 74 when the vacuum-relief valve 16 is in the closed position. Ideally, the seal is established between the pressure-relief valve 14, the axially outwardly facing lip 82 of the annular flange 80, and the vacuum-relief valve 16 to block flow of air and fuel vapor in the air passageway 74 through the vent aperture 85. The seal is created due to the pressure-relief spring 26, which extends between the annular valve plate 28 and cap 10, pushing the pressure-relief valve 14 into engagement with both the axially outwardly facing lip 82 of the annular flange 80 and with the vacuum-relief valve 16.

Figure 3:
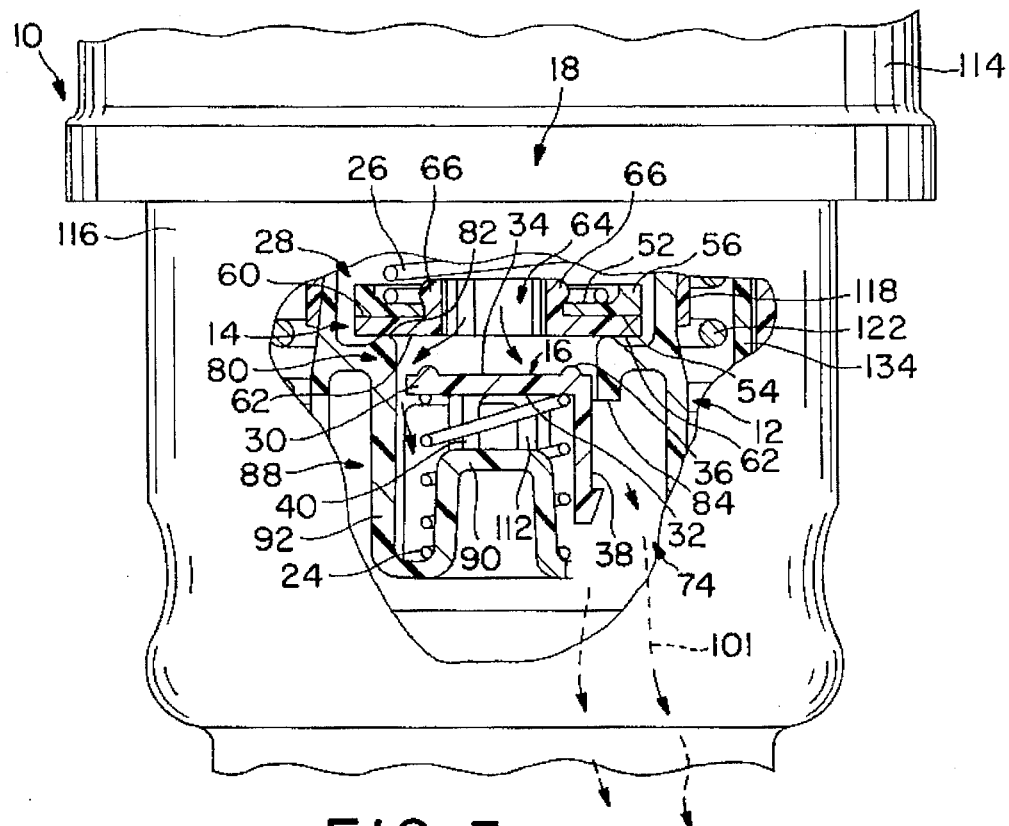
FIG. 3 is a view of the fuel cap illustrated in FIG. 2, with portions broken away to reveal the vent-valve assembly, showing the position of the vacuum-relief valve after it has moved in an axially inward direction in the air passageway away from the pressure-relief valve to permit ambient air to flow through an air-flow aperture formed in the pressure-relief valve, around the vacuum-relief valve, and into the fuel tank filler neck.

Both ambient air and fuel vapors may be channeled through the self-contained vent-valve assembly 18 in accordance with the present invention. In order to channel ambient air through the air passageway 74 from the axially outer end 72 to the axially inner end 70, a vacuum developed in the fuel tank (not shown) and filler neck 116 applies a suction force to move the vacuum-relief valve 16 in an axially inward direction against vacuum-relief spring 24 to a flow position as shown in FIG. 3. This movement permits ambient air to flow in an axially inward direction 101 through the air flow aperture 64 of the pressure-relief valve 14 and past the annular flange 80 and brace 88 and then into the filler neck 116 to raise the pressure in the tank and thus relieve said vacuum. Ideally, the pressure-relief spring 26 continues to push the pressure-relief valve 14 against the lip 82 even after the vacuum-relief valve 16 has been moved to the flow position.

In preferred embodiments, the brace 88 is formed to limit axially inward movement of the vacuum-relief valve 16 to a maximum flow position (not shown). Most preferably, at the maximum flow position, the axially inward side 32 of the valve member 30 engages the valve stop 90 thus blocking further axially inwardly movement of the vacuum-relief valve 16 in the air passageway 74. Once ambient air has entered the fuel tank to relieve said vacuum therein, the loaded vacuum-relief spring 24 presses the vacuum-relief valve 16 in the axially outward direction back toward the closed position until its pressure is counterbalanced by that of the pressure-relief spring 26 against the pressure-relief valve 14.

Figure 4:
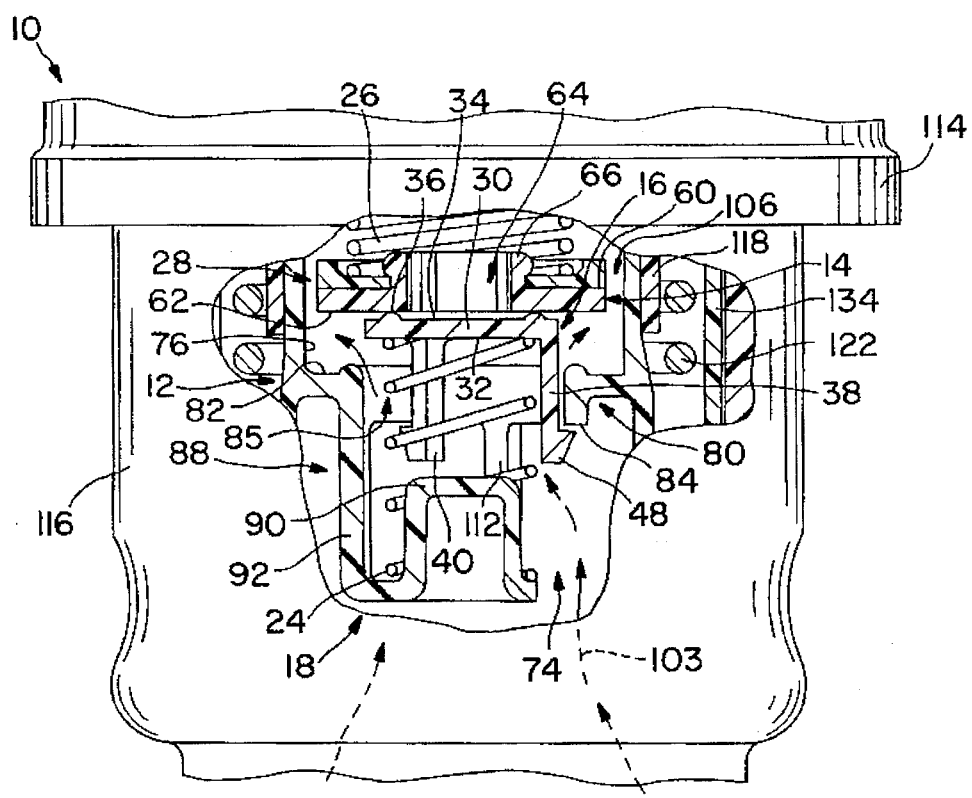
FIG. 4 is a view similar to that of FIG. 3 showing the pressure-relief valve in a fuel vapor-venting position after it has moved in an axially outward direction in the air passageway away from the lip to permit fuel vapor in the filler neck to vent to the atmosphere through the cap.

To channel fuel vapors through the air passageway 74 from the axially inner end 70 to the axially outer end 72 of the valve housing 12, a positive pressure developed in the fuel tank (not shown) and filler neck 116 applies a driving force to move the vacuum-relief valve 16 in an axially outward direction against the pressure-relief valve 14 and pressure-relief spring 26 to a venting position shown in FIG. 4. Air vents in the axially outward direction 103 through the air passageway 74, past the brace 88 and annular flange 80, and around the circumference of the pressure-relief valve 14 in order to exit the valve housing 12 and flow out of the cap 10.

In preferred embodiments, the valve housing 12 includes ribs 104 (see FIG. 2), extending in the axially outward direction from the axially outwardly facing lip 82 along the radially inwardly facing interior surface 76. The ribs 104 serve as guiding means for the axially outward movement of the pressure-relief valve 14 and thus form a vent passageway 106 (see FIG. 4) between the pressure-relief valve subassembly 22 and the radially inwardly facing interior surface 76 of the valve housing 12.

The positive pressure driving the vacuum-relief valve to the vent position (see FIG. 4) will subside after a sufficient amount of fuel vapor has been vented through the filler neck 116 from the fuel tank (not shown). This diminishing positive pressure allows the loaded pressure-relief spring 26 to move both the pressure-relief valve 14 and the vacuum-relief valve 16 in an axially inward direction toward the lip 82. This axially inward movement continues until the pressure-relief valve 14 engages the lip 82 and the vacuum-relief valve 16 is positioned in vent aperture 85 in the closed position, as shown in FIG. 2.

As best shown in FIG. 5, the valve housing 12 of the vent-valve assembly 18 according to the present invention forms a sub-assembly of a fuel cap 10. Since the vent-valve assembly 18 is constructed separately from the cap 10 and is entirely self-contained, its assembly is made easy and its insertion into a fuel cap 10 quite simple. To assemble the vent-valve assembly 18 in accordance with the present invention, an assembly technician or machine first secures the vacuum-relief valve subassembly 20 within the housing 12 (see FIG. 6). The vacuum-relief valve subassembly 20 is fastened in the housing 12 by extending the vacuum-relief spring 24 into the air passageway 74 through the axially outer end 72 of the valve housing 12 until it engages the lower end 94 of the brace 88. The vacuum-relief spring 24 is released and allowed to extend through the air passageway 74 toward the axially outer end 72 of the valve housing 12. The assembly technician or machine then inserts the vacuum-relief valve 16 into the air passageway 74 through the axially outer end 72. The vacuum-relief valve 16, having the guide legs 38, 40, 42 appended thereon, is pushed in the axially inward direction until each foot 48 is positioned axially inwardly relative the axially inwardly facing side 84 of the annular flange 80. Ideally, a sloped portion 108 is formed on each foot 48 to aid in the axially inward movement of the guide legs 38, 40, 42 past the axially outwardly facing lip 82 of the annular flange 80.

At this time, the assembly technician or machine releases the vacuum-relief valve 16 and the vacuum-relief spring 24 urges the valve member 30 of the vacuum-relief valve 16 in the axially outward direction through the air passageway 74. This axially outward movement continues until each radially outwardly extending foot 48 engages the axially inwardly facing retaining rim 84 of the annular flange 80 thereby securing the vacuum-relief valve 16 within the valve housing 12 of the vent-valve assembly 18.

In a preferred embodiment illustrated in FIG. 7, the three guide legs 38, 40, 42 extend in spaced-apart relation to one another about the valve member 30. The brace 88, on the other hand, includes three axially outwardly extending branches 92, 110, 112 which are positioned in spaced-apart relation to one another about the circumference of the annular flange 80 and which extend between the guide legs 38, 40, 42 to block radially outward movement of the vacuum-relief valve 16 in the air passageway 74. The vacuum-relief spring 24 is seated on the brace 88 so that the guide legs 38, 40, 42 are positioned radially outwardly relative to the vacuum-relief spring 24.

It is contemplated that the self-contained vent-valve assembly 18, in accordance with the present invention, is formed for insertion into a wide variety of fuel caps. One such filler neck cap 10 is illustrated in FIGS. 1 and 2 and is further described in detail in the patent application entitled "Quick-On Cap With Removal Delay Mechanism" filed on May 6, 1994, now, pending U.S. patent application Ser. No. 08/239,217, and in pending U.S. patent application Ser. No. 07/948,096 entitled "Quick-On Fuel Cap", the disclosures of which are expressly incorporated herein by reference.

Referring generally to FIG. 1, the vent-valve assembly 18 in accordance with the present invention is formed for insertion into cap 10 which includes a handle cover 114 and means for closing a filler neck 116. This closing means include an upper core 118, a sleeve biasing assembly 120 having a cam follower spring 122, an annular seal plate 124 and an annular seal 126, and the valve housing 12. The handle cover 114 of the cap 10 rotates the closure means relative to the filler neck 116 in both a cap-installation direction toward the filler neck 116 and a cap-removal direction away from the filler neck 116.

Ideally, the cap 10 of FIG. 1 includes means for providing a lost-motion driving connection between the handle cover 114 and the closure means during rotation of the handle cover 114 about an axis of rotation relative to the filler neck 116 in a cap-removal direction. This control means include a pair of C-shaped drive lugs 128 coupled to the handle cover 114 and a pair of cylindrical driven lugs 130 coupled to the upper core 118. Preferably cap 10 includes a torsion spring 132 coupled at one end to top spring mount 133 on handle cover 114 and at another end to bottom spring mount 137 on upper core 118. Following removal of cap 10 from the filler neck 116, the torsion spring 132 yieldably biases the driven lugs 130 into engagement with the drive lugs 128. Thus, the drive lugs 128 and driven lugs 130 of cap 10 are always positioned to provide a direct-drive driving connection between the handle cover 114 and the closure means during rotation of the handle cover 114 about the axis of rotation in a cap-advancing direction.

Furthermore, cap 10 includes a sleeve 134 formed to include a passageway 135 sized to receive the vent-valve assembly 18 therein. The sleeve 134 ideally has radially outwardly projecting, axially extending, and circumferentially spaced-apart ribs 136 and axially inwardly extending cam followers 138, as shown in FIG. 1. Moreover, the valve housing 12 includes a ring 140 which supports three upwardly presented cylindrical cams 142, 144, 146 for engagement with the cam followers 138. Cam angles of the cylindrical cams 142, 144, 146 are selected to assist rotation of the valve housing 12 in the cap-installation direction. An annular sealing ring 147 is carried on sleeve 134.

Following insertion of cap 10 into filler neck 116, rotation of the handle cover 114 rotates the valve housing 12 relative to the sleeve 134 to lock cap 10 in place, see, for example, FIG. 2. Rotation of the handle cover 114 moves three outwardly projecting and circumferentially spaced-apart retaining lugs 148, 150, 152 which are supported on the-ring 140 into engagement with internal flanges 154 to prevent axial outward movement of cap 10 from the filler neck 116. Rotation of the sleeve 134 is blocked during rotation of handle cover 114 and valve housing 12 relative to filler neck 116 by the ribs 130 which engage other internal flanges (not shown) formed in the filler neck 116. Reference is again made to U.S. application Ser. No. 07/948,096 for a more detailed description of the means and manner for anchoring cap 10 in a filler neck-closing position in filler neck 116.

It is easy to construct a self-contained vent-valve assembly 18 in accordance with the present invention using very little effort. The assembly technician or machine must simply insert the vacuum-relief valve subassembly 20 into the valve housing 12 and press down upon the vacuum-relief valve 16 until a sturdy connection has been created between the vacuum-relief valve 16 and the lip 82. The pressure-relief valve subassembly 22 is then simply placed upon the vacuum-relief valve subassembly 20 to complete the formation of the vent-valve assembly 18. Installation of the vent-valve assembly 18 is also simple. The assembly technician or machine simply snaps the assembly in the cap 10 configured for engagement with the vent-valve assembly 92.

Although the invention has been described in detail with reference to certain preferred embodiments, variations and modifications exist within the scope and spirit of the invention as described and defined in the following claims.

I claim:

1. A vent-valve assembly for use in a filler neck fuel cap, the vent-valve assembly comprising
   a valve housing sized for insertion into the cap, the housing having an axially inner end, an axially outer end, an air passageway communicating with the axially inner end and the axially outer end, and an annular flange located in the valve housing and extending into the air passageway, the annular flange being formed to include a retaining rim, seat means for providing a pressure-relief valve seat, and a vent aperture extending between the seat means and the retaining rim, a vacuum-relief valve including a valve member and at least one guide leg appended to the valve member, each guide leg having a foot member extending radially outwardly therefrom, a pressure-relief valve unit positioned in the air passageway axially outwardly from the valve member, the pressure-relief valve unit including a pressure-relief valve and means for normally urging the pressure-relief valve into engagement with the seat means to close the vent aperture, and spring means for biasing the valve member through the vent aperture defined by the annular flange toward the axially outer end of the housing and for urging the foot member on each guiding leg toward the retaining rim so that the foot member will engage the retaining rim upon removal of the pressure-relief valve unit from the air passageway in the valve housing to block removal of the vacuum-relief valve from the valve housing and thereby provide a self-contained vacuum-relief valve sub-assembly in the valve housing.

2. The vent-valve assembly of claim 1, wherein the valve member includes an axially inward side facing toward the axially inner end and an axially outward side facing toward the axially outer end and each guide leg includes a first end coupled to the axially inward side and a second end coupled to one of the foot members.

3. The vent-valve assembly of claim 2, wherein each foot member extends radially outwardly in the air passageway relative to the valve member.

4. The vent-valve assembly of claim 2, wherein the vacuum-relief valve includes three guide legs positioned in spaced-apart relation about the circumference of the valve member.

5. The vent-valve assembly of claim 4, wherein the spring means includes a vacuum-relief spring extending through the air passageway and lying in a position between the housing and the valve member of the vacuum-relief valve and radially inward relative to the three axially inwardly extending guide legs.

6. The vent-valve assembly of claim 1, wherein the housing further includes means for mounting the spring means in the air passageway.

7. The vent-valve assembly of claim 6, wherein the mounting means includes a brace coupled to the annular flange and arranged to extend in an axially inward direction through the air passageway toward the axially inner end of the housing.

8. The vent-valve assembly of claim 7, wherein the brace includes a valve stop and a branch formed to include an outer end coupled to the retaining rim and an inner end fixed to the valve stop, and the spring means extends between the inner end of the branch and the valve member.

9. The vent-valve assembly of claim 8, wherein the brace includes three axially inwardly depending branches positioned to lie in spaced-apart relation about the circumference of the annular flange.

10. The vent-valve assembly of claim 7, wherein the spring means includes a vacuum-relief spring extending through the air passageway and lying in a position between the brace and the valve member.

11. The vent-valve assembly of claim 1, wherein the spring means includes a vacuum-relief spring extending through the air passageway between the housing and the valve member.

12. The vent-valve assembly of claim 1, wherein the urging means includes an annular valve plate coupled to the pressure-relief valve and a pressure-relief spring arranged to extend through the air passageway in an axially outward direction away from the annular valve plate and toward the axially outer end of the housing.

13. The vent-valve assembly of claim 12, wherein the annular valve plate includes an outer side, an inner side, and an aperture extending between the outer side and the inner side and the pressure-relief valve includes an outward surface, an inward surface, an air flow aperture extending between the outward surface and the inward surface, and means for coupling the outward surface to the inner side of the annular valve plate so that the aperture formed in the valve plate and the air flow aperture are aligned to permit air flow therethrough.

14. The vent-valve assembly of claim 13, wherein the coupling means includes a holding portion mounted on the outward surface of the pressure-relief valve and arranged to extend through the aperture and engage the outward side of the annular valve plate.

15. The vent-valve assembly of claim 13, wherein the spring means includes a vacuum-relief spring extending between the housing and the valve member to bias the valve member in the vent aperture against the inward surface of the pressure-relief valve.

16. A vent-valve assembly for use in a filler neck fuel cap, the vent-valve assembly comprising a valve housing sized for insertion into the cap, the housing having an axially inner end, an axially outer end, and an air passageway communicating with the axially inner end and axially outer end, seal-establishing means for establishing a seal in the air passageway, a vacuum-relief valve positioned in the air passageway axially inwardly relative to the seal-establishing mean, the vacuum-relief valve being formed to include a valve member and means for retaining the valve member in the housing so that the valve member is mounted for movement within the air passageway, and spring means for yieldably biasing the valve member of the vacuum-relief valve into engagement with the seal-establishing means and for normally urging the retaining means through the air passageway of the housing so that the retaining means will engage the housing upon removal of the seal-establishing means from the air passageway to provide a self-contained vacuum-relief valve subassembly in the valve housing.

17. The vent-valve assembly of claim 16, wherein the retaining means includes at least one guide leg appended to the valve member and arranged to extend in an axially inward direction through the air passageway toward the axially inner end of the housing, and a foot member appended to each guide leg and arranged to extend in a radially outward direction from the guide leg.

18. The vent-valve assembly of claim 17, wherein the valve housing includes means for engaging each foot member so that movement of the valve member in an axially outward direction through the air passageway is blocked upon removal of the seal-establishing means from the air passageway.

19. The vent-valve assembly of claim 18, wherein the engaging means includes an annular flange having an axially inwardly facing retaining rim and seat means for providing a seat for the seal-establishing means and each foot member engages the retaining rim in response to removal of the seal-establishing means from the air passageway.

20. The vent-valve assembly of claim 18, wherein the housing is further formed to include supporting means for mounting the spring means in the air passageway.

21. The vent-valve assembly of claim 20, wherein the supporting means further includes means for limiting movement of the valve member in the axially inward direction in the air passageway.

22. The vent-valve assembly of claim 16, wherein the housing is formed to include means for mounting the spring means in the air passageway, the mounting means includes a brace coupled to the housing to extend into the air passageway, and the spring means lies in a position between the brace and the valve member.

23. The vent-valve assembly of claim 22, wherein the brace includes a valve stop and at least one branch and each branch includes an outer end coupled to the housing and an inner end fixed to the valve stop.

24. The vent-valve assembly of claim 22, wherein the brace includes three branches positioned to lie in spaced-apart relation about the circumference of the housing.

25. The vent-valve assembly of claim 16, wherein the housing includes a lip and the seal-establishing means includes a pressure-relief valve positioned in the air passageway axially outwardly from the lip.

26. The vent-valve assembly of claim 25, wherein the pressure-relief valve includes an outward surface facing the axially outer end, an inward surface facing the axially inner end, and an air flow aperture communicating with the outward surface and the inward surface, the inward surface of the pressure-relief valve engages the lip in a normal closed position and the air flow aperture is aligned with the air passageway to permit ambient air flow therethrough in response to the axially inwardly movement of the vacuum-relief valve from the lip.

27. The vent-valve assembly of claim 26, wherein the seal-establishing means further includes an annular valve plate having an outer side, an inner side, and an aperture communicating with the outer side and the inner side, the pressure-relief valve is coupled to the inner side of the valve plate, and the air flow aperture of the pressure-relief valve and the aperture of the valve plate are aligned to permit ambient air flow therethrough in response to the axially inwardly movement of the vacuum-relief valve from the retaining rim.

28. The vent-valve assembly of claim 26, wherein the pressure-relief valve is formed to include means for coupling the outward surface of the pressure-relief valve to the inner side of the annular valve plate.

29. The vent-valve assembly of claim 27, wherein the coupling means is a holding portion mounted to the outward surface of the pressure-relief valve and arranged to extend through the aperture and engage the outward side of the annular valve plate.

30. The vent-valve assembly of claim 26, wherein the seal-establishing means further includes a pressure-relief spring and the pressure-relief spring is positioned on the outer side of the valve plate and extends in an axially outward direction toward the axially outer end of the housing.

31. The vent-valve assembly of claim 25, wherein the seal-establishing means further includes an annular valve plate coupled to the pressure-relief valve and a pressure-relief spring extending in an axially outward direction in the air passageway from the annular valve plate.

32. A vent-valve assembly for use in a filler neck fuel cap, the vent-valve assembly comprising a valve housing sized for insertion into the cap, the housing having an axially inner end, an axially outer end, an air passageway communicating with the axially inner end and the axially outer end, and an annular flange located in the valve housing and extending into the air passageway, the annular flange being formed to include an axially outwardly facing valve seat, an axially inwardly facing retaining rim, and a vent aperture extending between the valve seat and the retaining rim, a vacuum-relief valve formed to include a valve member sized for insertion through the vent aperture and at least one guide leg appended to the valve member, each guide leg having a foot member extending radially outwardly therefrom, and spring means for yieldably urging each foot member into engagement with the retaining rim so that the vacuum-relief valve is in a raised position in the air passageway relative to the valve seat and for holding the valve member axially outwardly from the lip until a pressure-relief valve is inserted and biased into engagement with the lip.

33. The vent-valve assembly of claim 32, wherein each foot member extends radially outwardly through the air passageway and lies in a position radially outwardly relative to the valve member.

34. The vent-valve assembly of claim 32, wherein the valve member includes an axially inward side facing toward the axially inner end, an axially outward side facing toward the axially outer end, and three guide legs positioned to lie in spaced-apart relation about the circumference of the axially inward side of the valve member and each foot member is oriented to project in a radially outwardly extending direction and lie in a position radially outwardly relative to the valve member.

35. The vent-valve assembly of claim 34, wherein the spring means acts between the housing and the axially inward side of the valve member.

36. The vent-valve assembly of claim 32, wherein the housing further includes means for mounting the spring means in the air passageway.

37. The vent-valve assembly of claim 36, wherein the mounting means includes a brace coupled to the annular flange to extend in an axially inward direction through the air passageway toward the axially inner end of the housing and the spring means includes a vacuum-relief spring arranged to extend through the air passageway in an axially outward direction away from the brace and toward the axially outer end of the housing.

38. The vent-valve assembly of claim 37, wherein the brace includes a valve stop and at least one branch, each branch includes an outer end coupled to the retaining rim of the annular flange and an inner end fixed to the valve stop, and the vacuum-relief spring is positioned in the air passageway between each inner end and the valve member.

39. The vent-valve assembly of claim 38, wherein the valve member includes an axially inward side facing toward the axially inner end, an axially outward side facing toward the axially outer end, and three guide legs positioned in spaced-apart relation about the circumference of the axially inner side of the valve member and the guide legs are positioned to lie radially inwardly relative to each of the branches of the brace and radially outwardly relative to the valve stop.

40. The vent-valve assembly of claim 38, wherein the brace includes three branches positioned in spaced-apart relation to one another about the circumference of the retaining rim and the vacuum-relief spring extends axially outwardly in the air passageway and lies in a position radially outwardly relative to the valve stop and radially inwardly relative to the outer end of each of the three branches.

41. The vent-valve assembly of claim 36, wherein the spring means extends between the mounting means of the housing and the valve member of the vacuum-relief valve.

* * * * *